UNITED STATES PATENT OFFICE.

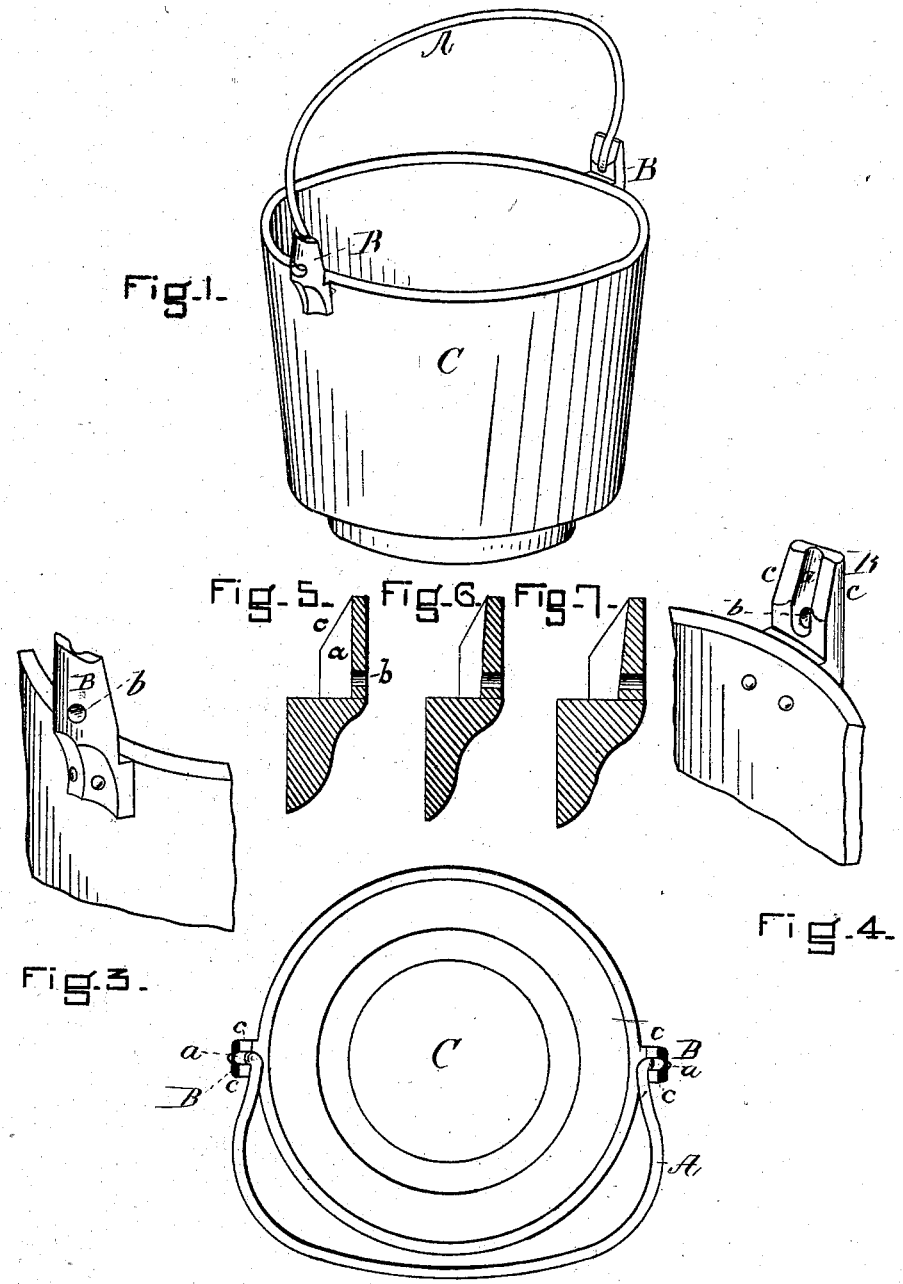

JOSEPH B. WESTCOTT, OF SOMERVILLE, MASSACHUSETTS.

BAIL EAR AND LUG.

SPECIFICATION forming part of Letters Patent No. 263,826, dated September 5, 1882.

Application filed April 20, 1882. (No model.)

*To all whom it may concern:*

Be it known that I, JOSEPH B. WESTCOTT, of Somerville, in the county of Middlesex and State of Massachusetts, have invented a certain new and useful Improvement in Bail Ears and Lugs, which improvement is fully set forth in the annexed specification and accompanying drawings.

Figure 1 is a perspective view of the bail and ear as attached to pot, A being the metal bail, B the ears, and C an ordinary iron pot. Fig. 2 shows the same with the bail thrown from its vertical position and resting upon the edge of the vessel. Figs. 3 and 4 represent in perspective front and back views of the ear enlarged. Figs. 5, 6, and 7 are vertical sections of different forms of ear, showing slots at various inclinations, but all decreasing in depth from the bottom toward the top.

The special parts used are an ordinary metal bail, in connection with an ear or lug of peculiar form, the latter of which is cast with or attached to the vessel in the usual manner. The ear or lug is shown in Fig. 3, also in Fig. 4, and when used with all ordinary hollow vessels—such as pots, kettles, &c.—preferably is cast on when the utensil is originally made. They are placed one on each side of the vessel, and is formed with a rounding cavity, $a$, extending from the top of these to the point where the same unites with the rim or top of the vessel. This rounding cavity, extending up and down the upwardly-projecting ear, is of a size corresponding to or a little larger than the size of the bail. Near the point where the ear unites with the rim a hole, $b$, is made entirely through the ear, into which the end of the bail is hooked. The projecting part of the ear is made sloping or beveling, so that the bail in being raised from the side will easily slide into the circular cavity in the ear, and in being moved from a vertical position be easily and gradually disengaged from the cavity. The slope or bevel of the projecting ear is seen at $c$. This circular perpendicular cavity or slot in the ear may be made either upon the inside or upon the outside of the ear-projection corresponding with the side on which the bevel is formed. The metal bail will be held in place and spring into the circular recess or slot whenever brought to a perpendicular position over the vessel. When the bail is hooked into the ear from the inside the slope of the projecting part of the ear is from the inside and upward and outward. When the bail is hooked into the ear from the outside the circular slot is outside and the slope from the projecting part of the ear is from the outside upward and inward.

The object of my invention is to enable the bail to be firmly held in an upright position.

In the ordinary form of bails as usually applied to kettles, pots, and other iron or metal vessels which are subjected to heat, the bail becomes hot and inconvenient to handle. With the ordinary bail, also, it is very difficult to take up the vessel and turn it over or partially to one side to remove the contents. By my invention the bail is held firmly in a perpendicular position, and only becomes heated very slightly, and the vessel can be readily handled by the bail in turning out the contents of the vessel. This latter point is of great utility, especially when pouring out the contents of a vessel while in a heated state.

My invention is applicable to all kinds of hollow vessels, and is also designed for any utensil where the bail is liable to become heated by contact with the rim or edge of the utensil, and where it is desirable to have the bail at times held in a rigid upright position. It may also be applied to various forms of griddles and broilers. When the utensil is made of cast metal the ears would be formed on at the time the utensil was made. When applied to other vessels or utensils the ears can be fastened upon the sides by riveting or soldering, in the ordinary manner, and the bail used in connection therewith hooked in and operated as described. The bail can of course be struck up from sheet metal.

What I claim for my invention, and desire to secure by Letters Patent of the United States, is—

1. A bail-ear beveled upon one side toward the top and having on that side a perpendicular slot decreasing in depth toward the top, and provided with a bail-hole near the bottom, substantially as and for the purposes set forth.

2. A bail ear or lug with bevels formed upon one side of the same toward the top, and provided with a perpendicular slot, and having a hole or aperture through the ear near the bottom and above the part by which it is attached or united to the vessel, the whole combined and adapted to engage the bail, substantially as and for the purposes set forth.

3. In a bail ear or lug, suitably-formed bevels upon one side, with a perpendicular slot separating the bevels, and the depth of the slot decreasing near the top, and provided with an aperture at the bottom or lower end of the perpendicular slot, and adapted, when engaged with a bail, to guide said bail from a horizontal to a vertical position to support the bail vertically and to reguide the bail to a horizontal position, all substantially as and for the purposes set forth.

4. The ear or lug B, with bevels $c\ c$ and slot $a$, in combination with the spring-bail A, substantially as and for the purposes set forth.

JOSEPH B. WESTCOTT.

Witnesses:
F. F. RAYMOND, 2d,
WILLARD C. FOGG.